United States Patent [19]

Stenzenberger

[11] Patent Number: 4,737,568
[45] Date of Patent: Apr. 12, 1988

[54] CURABLE RESIN FROM BIS-IMIDE AMINO ACID HYDRAZIDE AND ALKENYL PHENOL OR ETHER

[75] Inventor: Horst Stenzenberger, Schriesheim, Fed. Rep. of Germany

[73] Assignee: The Boots Company PLC, England

[21] Appl. No.: 879,202

[22] Filed: Jun. 26, 1986

[30] Foreign Application Priority Data

Jul. 20, 1985 [GB] United Kingdom ............... 85/18380

[51] Int. Cl.$^4$ ...................... C08G 69/08; C08G 73/08; C08G 73/10
[52] U.S. Cl. .................................... 528/170; 524/606; 524/607; 524/611; 528/27; 528/28; 528/168; 528/172; 528/173; 528/322
[58] Field of Search ............... 528/170, 168, 172, 173, 528/27, 28, 322; 524/606, 607, 611

[56] References Cited

U.S. PATENT DOCUMENTS 4,100,140 7/1978 Zahir et al. ............................ 526/90
4,211,861 7/1980 Stenzenberger .................... 528/170
4,303,779 12/1981 Stenzenberger .................... 528/170
4,608,426 8/1986 Stern .................................. 528/170

FOREIGN PATENT DOCUMENTS 0014816 9/1980 European Pat. Off. .
0022311 3/1981 Japan .

Primary Examiner—Harold D. Anderson
Attorney, Agent, or Firm—Jacobs & Jacobs

[57] ABSTRACT

Curable resins comprising a mixture of
(a) at least one bisimide of the general formula I

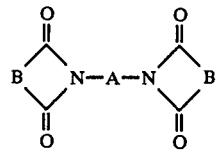

in which B represents a divalent radical containing a carbon-carbon double bond and A is a divalent radical containing at least two carbon atoms,
(b) at least one amino acid hydrazide of formula II $$H_2N-D-CO-NHNH_2 \qquad II$$

in which D is a divalent group, and
(c) at least one alkenylphenol or ether thereof of formula III $$G-(E)_m-G \qquad III$$

in which m=0 or 1, E is a divalent radical and G represents a phenyl ring substituted by at least one alkenyl group and at least one hydroxy or alkoxy group.

14 Claims, No Drawings

CURABLE RESIN FROM BIS-IMIDE AMINO ACID HYDRAZIDE AND ALKENYL PHENOL OR ETHER

The present invention relates to curable resins which are used to prepare cured resins of high fracture toughness.

According to a first aspect the present invention curable resins comprise a mixture of (a) at least one N,N'-bisimide resin of an unsaturated dicarboxylic acid of formula I

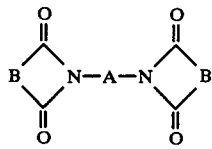

in which B represents a divalent radical containing a carbon-carbon double bond and A is a divalent radical containing at least two carbon atoms (b) at least one amino acid hydrazide of formula II $$H_2N-D-CO-NHNH_2 \qquad II$$

in which D is a divalent group, and (c) at least one alkenylphenol or ether thereof of formula III $$G-(E)_m-G \qquad III$$

in which m=0 or 1, E is a divalent radical and G represents a phenyl ring substituted by at least one alkenyl group and at least one hydroxy or alkoxy group.

The radical designated A in general formula I may be (a) an alkylene group with up to 12 carbon atoms, (b) a cycloalkylene group with 5 to 6 carbon atoms, (c) a heterocyclic group with 4 to 5 carbon atoms and at least one nitrogen, oxygen or sulphur atom in the ring, (d) a mono or dicarbocyclic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, or a group of formula IIIa to IIIj $$-N=N- \qquad IIIa$$

IIIb $$-NR^1- \qquad IIIc$$
$$-P(O)R^2- \qquad IIId$$

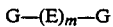
IIIe $$-SO_2- \qquad IIIf$$

IIIg

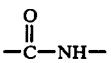
IIIh

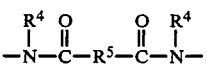
IIIi

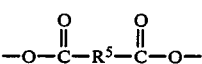
IIIj the radicals $R_1$, $R_2$, $R_3$, $R_4$, being alkyl groups with one to five carbon atoms, $R_5$ being an alkylene group or an arylene group.

The radical B in the general formula I represents a divalent organic radical containing a carbon-carbon double bond. The radical B may have a structure as shown in formula IV, V, VI or VII

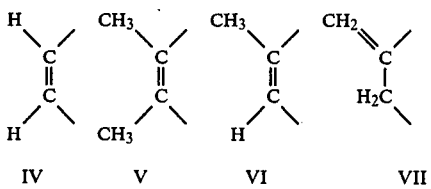

IV  V  VI  VII

Bismaleimides of formula I in which the radical B is of formula IV may be used for producing the new curable resins of the present invention. Examples of suitable bismaleimides are 1,2-bismaleimidoethane, 1,6-bismaleimidohexane, 1,12-bismaleimidododecane, 1,6-bismaleimido-(2,2,4-trimethyl)hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulphide, 3,3'-bismaleimidodiphenylsulphone, 4,4'-bismaleimidodiphenylsulphone, 4,4'-bismaleimidodicyclohexylmethane, 2,4-bismaleimidotoluene, 2,6-bismaleimidotoluene, 2,4-bismaleimidoanisole, N,N'-m-xylylenebismaleimide, N,N'-p-xylylenebismaleimide. Examples of other suitable bisimides are N,N'-m-phenylene-biscitraconomide and N,N'-4,4'-diphenylmethane-citraconimide, in which the radical B is of formula VI and N,N'-4,4'-diphenylmethane-bis-itaconomide in which the radical B is of formula VII. Mixtures of bisimides may be used. Preferred mixtures of bismaleimides are those which form low melting eutectic mixtures for example (i) eutectic mixtures containing 4,4'-bismaleimidodiphenylmethane and 2,4-bismaleimidotoluene, (ii) eutectic mixtures containing 4,4'-bismaleimidodiphenylmethane, 2,4-bismaleimidotoluene and 1,6-bismaleimido(2,2,4-trimethyl)hexane and (iii) eutectic mixtures of 4,4'-bismaleimidodiphenylmethane and 2,4-bismaleimidoanisole.

The bisimides of formula I may be modified with polyamines, polyhydrazides, azomethines carboxy-terminated or acrylic/vinyl terminated polybutadiene/acrylonitrile elastomers, thermoplastic polymers (for example polysulphones, polyhydantoins and polyimides) or mixtures thereof. These modified bisimides are used in a similar manner to that described herein for bisimides of formula I to prepare curable resins of the present invention.

The amino acid hydrazide of formula II may be derived from the group of amino acids selected from glycine, alanine, leucine, isoleucine, phenylalanine, valine, β-alanine, aminobutyric acid, aminocaproic acid, amino valeric acid and amino acids of general formula VIII $$H_2N-D'-COOH \qquad \text{VIII}$$

in which D' is a phenyl ring optionally substituted by one or more alkyl groups, a naphthyl group or a group of formula IX

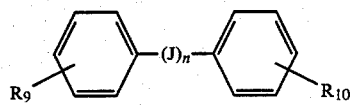

in which n=0 or 1, J represents a methylene group, an oxygen or sulphur atom or a group of formula $-SO_2-$ and $R_9$ and $R_{10}$ which may be the same or different are H or alkyl groups.

In preferred curable resins according to the present invention, the amino acid hydrazide is m-aminobenzoic acid hydrazide.

The alkenylphenol or ether thereof of formula III may be characterised in that E is a group of formula $-C(Me)_2-$, $SO_2$, $SO$, $S$ or $O$.

Preferred alkenylphenols or ethers thereof are characterised in that they have the general formula X

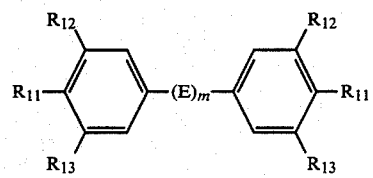

in which m=0 or 1, E is a group of formula $-C(Me)_2-$, $SO_2$, $SO$, $S$ or $O$, $R_{11}$ is OH or $OR_{14}$ in which $R_{14}$ is an alkyl group, $R_{12}$ is an allyl or methallyl group and $R_{13}$ is H or an allyl or methallyl group. A particularly preferred alkenylphenol is O,O'-diallylbisphenol A.

The bisimide component of the curable resins and the amino acid hydrazide component are reacted together prior to the copolymerisation with the alkenylphenol or ether thereof to form a modified bisimide. The ratio of the number of moles of bisimide present to the number of moles of amino acid hydrazide present in the modified bisimide may be in the range 1 to 100, preferably in the range 1 to 50 and most preferably in the range 5 to 20. The ratio of the number of moles of bisimide present to the number of moles of alkenylphenol or ether thereof present in the curable resins of the present invention may lie in the range 1 to 50, preferably in the range 1 to 20, most preferably in the range 2 to 10.

The preparation of the new curable resins may be carried out in an inert organic solvent or diluent, for example in dimethylformamide, dimethylacetamide, N-methyl pyrrolidone and tetramethyl urea, or ketone type solvents such as acetone, methylethyl ketone, methyl isobutyl ketone and cyclohexanone or chlorinated solvents such as methylene chloride, ethyl chloride, 1,2-dichloroethane and ether-type solvents such as dioxane, tetrahydrofuran, ethyl glycol and ester type solvents such as ethyl acetate or mixed glycol ether-esters such as ethyl glycol acetate, methyl glycol acetate, diethylene glycol diethyl ether, diethylene glycol monoethyl ether acetate etc. in such a manner that prepolymer solutions are obtained. The prepolymer can be isolated by stripping off the solvent either in vacuum or by heat or both, thus providing a solventless resin that can either be processed from the melt or as a powder. The production of the new curable resins according to this invention can also be carried out in inert diluents in which either only one of the starting materials is completely soluble or all the starting components are completely soluble. The latter procedure is preferred when the application of the resin requires a solution as is the case for the production of prepregs.

The preparation of the new curable resins may alternatively be performed by using conventional techniques for mixing and grinding of powders or powders and liquids to intimately blend the bismaleimides with the other components. In this case prepolymers are obtained by heating the homogeneous mixture at a temperature between 80° and 200° C., for sufficient time to produce a still formable and soluble product.

For many industrial applications of the new curable resins of the present invention, it is advantageous to accelerate the curing process by adding catalysts. The catalysts may be present in an amount of 0.01 to 10% by weight (preferably 0.5 to 5% by weight) based on the total weight of the curable bisimide resin. Suitable catalysts include ionic and free radical polymerisation catalysts. Examples of ionic catalysts are (a) alkali metal compounds for example alkali metal alcoholates such as sodium methylate or alkali metal hydroxides, (b) monoamines such as benzylamine, diethylamine, trimethylamine, triethylamine, tributylamine, triamylamine, N,N-dimethylaniline, N,N-dimethylbenzylamine, tetramethyldiaminodiphenylmethane, N,N-diisobutylaminoacetonitrile and N,N-dibutylaminoacetonitrile, (c) heterocyclic amines such as quinoline, N-methylpyrrolidine, imidazole, benzimidazole, N-methylmorpholine and azabicyclooctane, (d) polyamines containing several amino groups of different types such as mixed secondary/tertiary polyamines, (e) quaternary ammonium compounds such as benzyltrimethylammonium hydroxide and benzyltrimethylammonium methoxide and (f) mercaptobenzothiazole. Examples of free radical polymerisation catalysts include (a) organic peroxides such as ditertiary butyl peroxide, diamylperoxide and t-butylperbenzoate and (b) azo compounds such as azoisobutyronitrile. Further catalysts which can be used are metal acetylacetonates especially transition metal acetylacetonates such as vanadium acetylacetonates.

The catalysts can be admixed with the components of the curable resins or they may be added during the production of the prepolymers either by a power blending process or by the solvent blending process described above.

In many cases the new curable resins of the present invention may be processed from the melt. To reduce the melt viscosity and to improve the pot life the resins can be blended with so-called reactive diluents, preferably those that are liquid at room temperature. The reactive diluents that may be employed carry one or more polymerizable double bonds of the general formula XI $$CH_2=C<$$

and may be of the vinyl-, allyl- or acryloyl-type. These reactive diluents can be of the ether, ester, hydrocarbon or heterocyclic type. Typical ethers that may be employed are vinylallylether, diallylether, methallylether and vinylphenylether. Typical esters are vinyl-, allyl-, methylallyl-, 1-chloroallyl-, crotyl-, isopropenyl esters derived from saturated or unsaturated aliphatic or aromatic mono- or polycarboxylic acids such as formic, acetic, propionic, butyric, oxalic, malonic, adipic, sebacic, acrylic, methacrylic, phenylacrylic, crotonic, maleic, fumaric, itaconic, citraconic, tetrahydrophthalic, benzoic, phenylacetic, o-phthalic, isophthalic or terephthalic acid and naphthalic-dicarboxylic acid or mixtures thereof. The most important hydrocarbon type reactive diluents to be used are styrene, methylstyrene, vinylhexane, vinylcyclohexane, divinylbenzene, divinyl cyclohexane, diallylbenzene, vinyltoluene and 1-vinyl-4-ethyl-benzene or mixtures thereof. Examples of heterocyclic type reactive diluents are vinylpyridine and vinylpyrrolidine.

In those cases where reactive diluents are used it is possible to first blend and bisimide components with the reactive diluent and then the other components are added. The quantity of reactive diluent that may be employed can be up to 80% by weight of the total final resin mixture.

Very advantageous reactive diluents are styrene and divinylbenzene which are used in quantities up to 30% of the total resin mixture. Care has to be taken with these diluents because they crosslink at very low temperatures, at around 100°-110° C., therefore mixtures containing these diluents have to be prepared at temperatures well below 100° C.

The new curable resins of the present invention can be further modified with unsaturated polyester resins. Useful unsaturated polyesters are well known products which are prepared by polycondensation of polycarboxylic acid derivatives such as esters with polyglycols as described in detail in Kunststoffhandbuch, Band VII, p. 247-282, Carl Hanser Verlag, Munchen 1973. Solutions of these polyesters in the reactive diluents described above can be used instead of the reactive diluent alone to modify the new resins.

The new curable resins of the present invention either modified or not or prepolymers prepared therefrom can be thermally converted to crosslinked polymers by heating them to temperatures of between 80° and 400° C., for a time sufficient to complete cure.

The new curable resins are advantageously used to produce laminated materials. In such a case the curable resins or prepolymers produced from the curable resins are dissolved in suitable solvents to provide a 25-65% by weight solution, which is used to impregnate glass fibres in the form of fabrics or rovings or carbon fibres or boron fibres or organic synthetic fibres in the form of fabrics, filaments or rovings. The material impregnated with this solution is then stripped of the solvent by drying after which they are moulded into laminate form by the application of pressure and temperature, the crosslinked polymer being the binder. Suitable solvents include dimethylformamide, dimethylacetamide, N-methyl pyrrolidone, tetramethyl urea, acetone, methylethyl ketone, methyl-isobutyl ketone, cyclohexanone, methylene chloride, ethyl chloride, 1,2-dichloroethane, dioxane, tetrahydrofuran, ethyl glycol, ethyl acetate, ethyl glycol acetate, methyl glycol acetate, diethyleneglycol diethyl ether, diethyleneglycol monoethyl ether acetate and mixtures thereof.

The curable resins according to the invention can also be processed by the known methods of the powder moulding industry in relation to curable compositions, to produce mouldings, curing out taking place with simultaneous shaping under pressure. For these applications the curable resins are admixed with additives such as fillers, colourants, softeners and flameproofing agents. Ideal fillers are for example glass fibres, carbon fibres, organic high modulus fibres such as aramides, quartz flour, kaolin, silica, ceramics and metals in the form of fine powders for example produced by micronisation.

One of the preferred uses of the new resin composition is as binders for fibre composites. For this application fibres such as glass, graphite or aramides in the form of rovings, fabrics or short fibremats, or felts are impregnated with the composition, employing resin solution as mentioned above to impregnate said reinforcements. After stripping off or drying off the solvent employed a prepreg is left, which is the second phase may be cured at a temperature between 180° and 350° C., optionally under pressure.

In another preferred use of the resin compositions of the present invention the resin is cast into film and sheets of film are stacked alternately with layers of reinforcing material for example glass fibre. The resulting stack is subjected to heat and pressure to form a laminated structure.

The curable resins produced by the present invention are used to produce cured resins which have high fracture toughness. This invention is illustrated by the following Examples which are given by way of example only. In the Examples the fracture toughness is measured by a method derived from the described in ASTM E399-78 in which a bar of resin 51.25 mm long, 6.25 mm wide and 12.5 mm deep is cut from a casting and a groove 5.4 to 6.0 mm deep is cut centrally across the width of the bar. The base of the groove is scored once along its length prior to performing the test.

EXAMPLE 1

A solution of m-aminobenzoic acid hydrazide (5 parts) in methylglycolacetate (50 parts) is prepared at 60° C. To this solution 4,4'-bismaleimidodiphenylmethane (85 parts) are added, and the resulting mixture in heated, whilst stirring, to 130° C. After a homogeneous solution is obtained, o,o'-diallylbisphenol A (15 parts) are added. Then methylgycolacetate is stripped off at a temperature of 120°–140° C., leaving a resin melt containing 0.7% of residual solvent. The resin is cooled down to 80°–85° C., and a solution of imidazole (0.32 parts) in methylglycolacetate (1.25 parts) is added under rapid agitation. The resin melt obtained is cast into a parallel epipedic mould and cured under a pressure of 5 bars for 1 hour at 130° C., plus 5 hours at 180° C. After demoulding, the resin casting is postcured at 210° C. for 2 hours, plus 5 hours at 250° C.

Properties:
Density: 1.30 g/cm$^3$
Flexural strength at 25° C.: 125 N/mm$^2$
Flexural strength at 250° C.: 75 N/mm$^2$
Flexural modulus at 25° C.: 4067 N/mm$^2$
Flexural modulus at 250° C.: 2445 N/mm$^2$
Fracture toughness at 25° C.: 967 J/m$^2$ The properties of the above resin made in accordance with the present invention were compared with the properties of prior art resins made in accordance with Comparative Examples A and B below.

COMPARATIVE EXAMPLE A

A resin is prepared according to Example 1 of U.S. Pat. No. 4,211,861. m-Aminobenzoic acid hydrazide (18.12 parts) are dissolved in methylglycolacetate (180 parts) at 60° C. To this solution 4,4'-bismaleimidodiphenylmethane (107.5 pats) is added, and the mixture is heated to a temperature of 125° C., at which temperature a homogeneous melt is obtained. Solvent is then stripped off in a vacuum, and the melt obtained is cast into a parallel epipedic mould and cured at a pressure of 4 bars for 3 hours at 170° C., plus 3 hours at 200° C. Postcure after demoulding was 5 hours at 210° C., plus 5 hours at 250° C.

Properties:
Flexural strength at 25° C.: 90 N/mm$^2$
Flexural strength at 250° C.: 60 N/mm$^2$
Flexural modulus at 25° C.: 5300 N/mm$^2$
Flexural modulus at 250° C.: 3200 N/mm$^2$
Fracture toughness at 25° C.: 40 J/m$^2$

COMPARATIVE EXAMPLE B

A resin is prepared according to U.S. Pat. No. 4,100,140, Example 1, by blending 4,4'-bismaleimidodiphenylmethane (179 parts), o,o'-diallylbisphenol A (134 parts) and 0.3% 2-methylimidazole at 130° C. The catalyst (2-methylimidazole) is introduced as a solution in toluene and the solvent is then distilled off. The resin is cast in a steel mould and cured for 1 hour at 140° C. plus 3 hours at 190° C., at a pressure of 4 bars. Postcure was done for 12 hours at 210° C.

Properties:
Flexural strength at 25° C.: 132 N/mm$^2$
Flexural strength at 200° C.: 15.8 N/mm$^2$
Flexural modulus at 25° C.: 3941 N/mm$^2$
Flexural modulus at 200° C.: 528 N/mm$^2$
Fracture toughness at 25° C.: 355 J/m$^2$ The resin casting of Example 1 showed considerably greater fracture toughness than either of the prior art resin castings.

EXAMPLE 2 m-Aminobenzoic acid hydrazide (5 parts) are dissolved in methylglycol acetate (50 parts) as a solvent. To this solution are added 4,4'-bismaleimidodiphenylmethane (56 parts), 2,4-bismaleimidotoluene (24 parts) and o,o'-diallylbisphenol A (30 parts), and they are blended at a temperature of 150° C. After obtaining a clear resin solution, the solvent is stripped off in vacuum, leaving a resin melt which, after cooling to 100° C., is cast into a steel mould and is cured 2 hours at 160° C., plus 5 hours at 180° C. It is then demoulded and postcured at 210° C. for 2 hours, plus 5 hours at 240° C. The cured resin showed the following properties:

Density: 1.26 g/cm$^3$
Flexural strength at 20° C.: 147 N/mm$^2$
Flexural strength at 250° C.: 48 N/mm$^2$
Flexural modulus at 20° C.: 4112 N/mm$^2$
Flexural modulus at 250° C.: 1972 N/mm$^2$
Fracture toughness at 20° C.: 902 J/m$^2$ If the resin casting is postcured for an additional 10 hours at 250° C., the following properties are measured:
Flexural strength at 20° C.: 130 N/mm$^2$
Flexural strength at 250° C.: 76 N/mm$^2$
Flexural modulus at 20° C.: 4320 N/mm$^2$
Flexural modulus at 250° C.: 2458 N/mm$^2$
Fracture toughness at 20° C.: 450 J/m$^2$

EXAMPLE 3

A resin is prepared as described in example 2, using the following ingredients:
56 parts of 4,4'-bismaleimidodiphenylmethane
24 parts of 2,4-bismaleimidotoluene
20 parts of o,o'-diallylbisphenol A
5 parts of m-aminobenzoic acid hydrazide.

The cast resin is cured for one hour at 140° C., one hour at 160° C., followed by 3 hours at 180° C. at a pressure of 5 bars. After demoulding, the resin is postcured 2 hours at 210° C. plus 5 hours at 250° C.

Properties:
Density: 1.29 g/cm$^3$
Flexural strength at 20° C.: 126 N/mm$^2$
Flexural strength at 250° C.: 100 N/mm$^2$
Flexural modulus at 20° C.: 4368 N/mm$^2$
Flexural modulus at 250° C.: 2818 N/mm$^2$
Fracture toughness at 20° C.: 300 J/m$^2$

EXAMPLE 4

A solution of m-aminobenzoic acid hydrazide (5 parts) in methylglycololacetate (50 parts) is prepared at 60° C. To this solution, 4,4'-bismaleimidodiphenylmethane (85 parts) is added, and the mixture heated to 150° C. After a homogenous solution is obtained (c. 10 mins), methylglycolacetate (25 parts) are stripped off and o,o'-diallylbisphenol A (15 parts) is added. The mixture is heated at 150° C. for another 5 minutes and then the solvent is stripped off in vacuum, leaving a resin which contains approx. 2.4% of residual solvent. The resin is cast into a mould and cured at a pressure of 5 bars for 2 hours at 160° C. plus 5 hours at 180° C. After demoulding, the resin plate is postcured for 5 hours at 210° C. plus 5 hours at 240° C.

Properties of cured resin castings:
Density: 1.28 g/cm$^3$
Flexural strength at 20° C.: 105 N/mm$^2$
Flexural strength at 250° C.: 82 N/mm$^2$
Flexural modulus at 20° C.: 3992 N/mm$^2$
Flexural modulus at 250° C.: 2579 N/mm$^2$
Fracture toughness at 20° C.: 286 J/m$^2$

EXAMPLE 5

4,4'-Bismaleimidodiphenylmethane (85 parts), o,o'-diallylbisphenol A (30 parts), m-aminobenzoic acid hydrazide (5 parts) are blended, in the presence of methylglycolacetate (50 parts) as a diluent, at a temperature of 130° C. After 10 minutes, a homogenous low viscosity solution is obtained, and methylglycolacetate is stripped off, finally employing vacuum, leaving a resin melt containing 2.4% of residual solvent. The resin is cooled down to 80° C. and cast into a parallel epipedic mould and cured at 160° C. for 2 hours and at 210° C. for 4 hours, under a nitrogen pressure of 4 bars. After postcure for 5 hours at 250° C., the following properties are obtained:
Density: 1.26 g/cm$^3$
Flexural strength at 20° C.: 147 N/mm$^2$
Flexural strength at 250° C.: 17 N/mm$^2$
Flexural modulus at 20° C.: 3752 N/mm$^2$
Flexural modulus at 250° C.: 882 N/mm$^2$
Fracture toughness at 20° C.: 363 J/m$^2$

EXAMPLE 6

A solution of m-aminobenzoic acid hydrazide (5 parts) in methylglycolacetate (50 parts) is prepared at a temperature of 60° C. To this solution, 4,4'-bismaleimidodiphenylmethane (85 parts) is added, and the mixture is heated to a temperature of 140° C., until a homogenous solution is obtained. To this solution are added o,o'-diallylbisphenol A (20 parts). From the resulting mixture, the methylglycolacetate solvent is stripped off, finally employing a vacuum. The resulting resin melt is blended with triallylcyanurate (20 parts), and the homogenous melt is cooled to 80° C. Then, a solution of imidazole (0.3 parts) in triallylcyanurate (20 parts) is added whilst stirring. The resin blend containing the catalyst is cast into a parallel epipedic mould and cured under a pressure of 5 bars for 1 hour at 130° C., plus 2 hours at 210° C., plus 5 hours at 250° C. The following mechanical properties are obtained:

Density: 1.16 g/cm$^3$
Flexural strength at 25° C.: 118 N/mm$^2$
Flexural strength at 250° C.: 21.5 N/mm$^2$
Flexural modulus at 25° C.: 3691 N/mm$^2$
Flexural modulus at 250° C.: 829 N/mm$^2$
Fracture toughness at 20° C.: 810 J/mm$^2$

EXAMPLE 7 m-Aminobenzoic acid hydrazide (5 parts) and methylglycolacetate (50 parts) are heated to 60° C. to obtain a solution. To this solution, 4,4'-bismaleimidodiphenylmethane (85 parts) is added, and the stirred mixture is heated to a temperature of 140°–145° C., at which a clear solution is obtained. To this solution, a polyesterimide (20 parts) (sold under the trade name Dobekane FT 3085 by Beck GmbH—Hamburg), are added, and then methylglycolacetate (25 parts) is stripped off in vacuum. Then o,o'-diallylbisphenol A (20 parts) are added, followed by stripping off methylglycolacetate in vacuum. The residual solvent content is 2%. The mixture is allowed to cool down to a temperature of 85° C., at which commercially available divinylbenzene (20 parts), (an approximately 1:1 mixture of 1,4-divinylbenzene and 1-vinyl-4-ethylbenzene), are added and properly mixed. The resin at a temperature of 85° C. is cast into a parallel epipedic mould and cured under a pressure of 5 bars for 2 hours at 125° C., plus 4 hours at 160° C. After demoulding, the plate is postcured at 180° C., for 3 hours at 210° C., plus 5 hours at 250° C. The cured resin showed the following mechanical properties:
Density: 1.27 g/cm$^3$
Flexural strength at 25° C.: 142 N/mm$^2$
Flexural modulus at 25° C.: 4259 N/mm$^2$
Fracture toughness at 25° C.: 1852 J/m$^2$

EXAMPLE 8 m-Aminobenzoic acid hydrazide (5 parts) are dissolved in methylglycolacetate (50 parts). To this solution are added 4,4'-bismaleimidodiphenylmethane (56 parts), 2,4-bismaleimidotoluene (24 parts) and 4,4'-methylenebis(N-benzylideneaniline) (20 parts).

The mixture is heated to 130° C. for 30 minutes, and after this time a homogenous blend is obtained, Methylglycolacetate (25 parts) are then distilled off. To the resin blend, o,o'-diallylbisphenol A (20 parts) are added, and then the rest of the methylglycolacetate is distilled off in a vacuum. The resin is allowed to cool to 80° C., and the commercially available divinylbenzene described in Example 8 (20 parts) are added and homogenously blended.

The resin is cast into a parallel epipedic steel mould and cured under a pressure of 5 bars for 1 hour at 140° C., plus 3 hours at 180° C. After demoulding, the resin casting is postcured for 2 hours at 210° C., plus 5 hours at 250° C.
Properties:
Density: 1.25 g/cm$^3$
Flexural strength at 25° C.: 121.5 N/mm$^2$
Flexural strength at 250° C.: 15 N/mm$^2$
Flexural modulus at 25° C.: 4263 N/mm$^2$
Flexural modulus at 250° C.: 915.8 N/mm$^2$
Fracture toughness at 25° C.: 199.5 J/m$^2$

EXAMPLE 9 m-Aminobenzoic acid hydrazide (5 parts) are dissolved in methylglycolacetate (50 parts) at 60° C. To this solution are added 4,4'-bismaleimidodiphenylmethane (85 parts), and the resulting mixture is heated, whilst stirring, to a temperature of 130° C., at which a homogenous solution is obtained. o,o'-Diallylbisphenol A (20 parts) are blended into the mixture and then solvent is stripped off in a vacuum, leaving a resin containing 3% of residual solvent. Trimethylolpropanetriacrylate (10 parts) are blended into the resin at a temperature of 90° C. The low viscosity melt is cast into a parallel epipedic mould and cured under a pressure of 5 bars at 170° C. for 2 hours, plus 5 hours at 190° C. After demoulding, the resin castings are postcured at 210° C. for 2 hours, plus 5 hours at 250° C.

Properties:
Density: 1.28 g/cm$^3$
Flexural strength at 25° C.: 126 N/mm$^2$
Flexural strength at 250° C.: 61 N/mm$^2$
Flexural modulus at 25° C.: 3753 N/mm$^2$
Flexural modulus at 250° C.: 2092 N/mm$^2$
Fracture toughness at 25° C.: 231 J/m$^2$

EXAMPLE 10

A resin consisting of m-aminobenzoic acid hydrazide (5 parts), 4,4'-bismaleimidodiphenylmethane (56 parts), 2,4-bismaleimidotoluene (24 parts), o,o'-diallylbisphenol A (15 parts) and diallylphthalate (15 parts) is prepared as described in Example 9, using methylglycolacetate as a solvent. The resin is cured at a pressure of 5 bars at 150° C. for 2 hours, plus 3 hours at 180° C., and postcured free standing for 2 hours at 210° C., plus 5 hours at 250° C.

Properties:
Density: 1.28 g/cm$^3$
Flexural strength at 25° C.: 128 N/mm$^2$
Flexural strength at 250° C.: 94.5 N/mm$^2$
Flexural modulus at 25° C.: 4393 N/mm$^2$
Flexural modulus at 250° C.: 2997 N/mm$^2$
Fracture toughness at 25° C.: 285 J/m$^2$

EXAMPLE 11

4,4-Bismaleimidodiphenylmethane (85 parts) is added to a solution of aminobenzoic acid hydrazide (5 parts) in methylglycolacetate (50 parts) and the mixture is heated to 130° C. o,o-Diallylbisphenol A (20 parts) and a vinylester (20 parts) (sold under the trade name Deracane 200—by DOW Chemicals) are added to the mixture and then solvent is stripped off in vacuum. Finally a resin melt is obtained, which contains only 0.3% of residual solvent. The melt is allowed to cool down to 100° C. and cast into a parallel epipedic mould and cured under a pressure of 5 bars at 110° C. for 30 minutes, 2 hours at 180° C. and 3 hours at 210° C. After demoulding, the resin casting is postcured for 2 hours at 210° C., plus 5 hours at 240° C.

Properties:
Density: 1.21 g/cm$^3$
Flexural strength at 25° C.: 99 N/mm$^2$
Flexural strength at 250° C.: 59 N/mm$^2$
Flexural modulus at 25° C.: 3654 N/mm$^2$
Flexural modulus at 250° C.: 1705 N/mm$^2$
Fracture toughness at 25° C.: 338 J/m$^2$

EXAMPLE 12

4,4-bismaleimidodiphenylmethane (56 parts), 2,4-bismaleimidotoluene (24 parts) and CTBN-rubber (sold under the trade name Hycar 1300X8) (25 parts) are melt blended at 140° C. for 3 hours. To this melt is added a solution of aminobenzoic acid hydrazide (5 parts) and o,o'-diallylbisphenol A (20 parts) in methylglycolacetate (50 parts). The mixture is heated to 150° C. Solvent is stripped off at this temperature in vacuum. The melt is finally cooled down to 100° C., at which temperature the resin is cast into a parallel epipedic mould and cured at a pressure of 5 bars for 2 hours at 150° C., plus 5 hours at 200° C. After cooling to room temperature, the casting is demoulded and postcured for 2 hours at 210° C., plus 5 hours at 250° C.

Properties:
Density: 1.22 g/cm$^3$
Flexural strength at 25° C.: 108 N/mm$^2$
Flexural strength at 250° C.: 47 N/mm$^2$
Flexural modulus at 25° C.: 2388 N/mm$^2$
Flexural modulus at 250° C.: 1237 N/mm$^2$
Fracture toughness at 25° C.: 1167 J/m$^2$

EXAMPLE 13

A bismaleimide resin mixture containing 4,4-bismaleimidodiphenylmethane (56 parts), 2,4-bismaleimidotoluene (24 parts) and 1,6-bismaleimido(2,2,4-trimethyl)hexane (20 parts) is added to a solution of m-aminobenzoic acid hydrazide (5 parts) in methylglycolacetate (50 parts) at 140° C. o,o'-Diallylbisphenol A (15 parts) are added and the resulting mixture is heated for 15 minutes at 140° C. Solvent is stripped off in vacuum and the resin is cooled down to 85° C. at which temperature a solution of 2-methylimidazole (0.25 parts) in methylglycolacetate (1 part) is added and properly blended into the resin melt. The resulting melt is poured into a mould which is cured at a pressure of 5 bars for 1 hour at 150° C., plus 5 hours at 190° C. After demoulding the resin is postcured for 2 hours at 210° C., plus 5 hours at 250° C.

Properties:
Density: 1.29 g/cm$^3$
Flexural strength at 25° C.: 135 N/mm$^2$
Flexural strength at 250° C.: 61 N/mm$^2$
Flexural modulus at 25° C.: 4350 N/mm$^2$
Flexural modulus at 250° C.: 2171 N/mm$^2$
Fracture toughness at 25° C.: 285 J/m$^2$

EXAMPLE 14 m-Aminobenzoic acid hydrazide (5 parts) are dissolved in methylglycolacetate (50 parts) at a temperature of 60° C. 4,4-Bismaleimidodiphenylmethane (56 parts) and 2,4-bismaleimidotoluene (24 parts) and an unsaturated polyesterimide, (sold under the trade name DOBEKANE FT 3085 by Beck GmbH—Hamburg) (20 parts) are added and the mixture is heated to 120° C. o,o'-Diallylbisphenol A (25 parts) and the temperature is raised to 145° C., at which temperature methylglycolacetate is stripped off. To the remaining melt are added O,O'-diallylbisphenol A (20 parts) and the temperature is raised to 145° C., at which temperature methylglycolacetate is stripped off. The melt is then allowed to cool down to 80° C., and styrene (5 parts) is homogenously blended into the resin mixture. The resin is then cast into a parallel epipedic mould and cured under a pressure of 5 bars for 2 hours at 120° C., plus 1 hour at 160° C., plus 5 hours at 200° C. After demoulding the resin castings are postcured for 2 hours at 210° C., plus 5 hours at 250° C.

Properties:
Density: 1.35 g/cm$^3$
Flexural strength at 25° C.: 116 N/mm$^2$
Flexural strength at 250° C.: 43 N/mm$^2$
Flexural modulus at 25° C.: 4131 N/mm$^2$
Flexural modulus at 250° C.: 1394 N/mm$^2$
Fracture toughness at 25° C.: 454 J/m$^2$

I claim:
1. Curable resin comprising a mixture of
(a) at least one bisimide of the general formula I

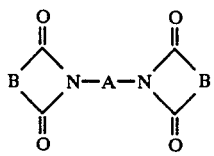

in which B represents a divalent radical containing a carbon-carbon double bond and A is a divalent radical containing at least two carbon atoms,
(b) at least one amino acid hydrazide of formula II

H$_2$N—D—CO—NHNH$_2$     II in which D is a divalent group, and
(c) at least one alkenylphenol or ether thereof of formula III G—(E)$_m$—G     III in which m is 0 or 1, E is a divalent radical and G represents a phenyl ring substituted by at least one alkenyl group and at least one hydroxy or alkoxy group.

2. Curable bisimide resin according to claim 1 in which the bisimide of the general formula I is characterised in that
A is a member selected from the groups consisting of
(a) an alkylene group with up to 12 carbon atoms,
(b) a cycloalkylene group with 5 to 6 carbon atoms,
(c) a heterocyclic group with 4 to 5 carbon atoms and at least one nitrogen, oxygen or sulphur atom in the ring, (d) a mono or dicarboxylic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, or a group of formulae IIIa to IIIj

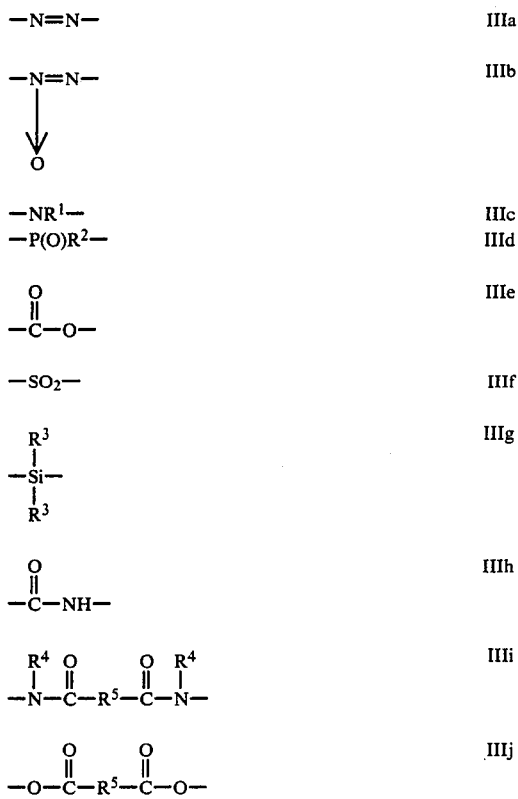

the radicals R$_1$, R$_2$, R$_3$, R$_4$, being alkyl groups with one to five carbon atoms, R$_5$ being an alkylene group or an arylene group and
B is a group which is capable of addition polymerization selected from a group of formula IV, V, VI or VII

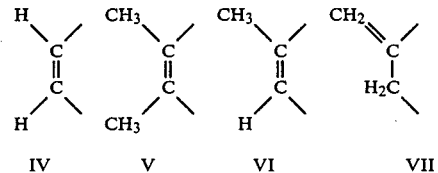

in which the amino acid hydrazide of formula II is derived from the group of amino acids selected from glycine, alanine, leucine, isoleucine, phenylalanine, valine, β-alanine, aminobutyric acid, aminocaproic acid, amino valeric acid or amino acids of general formula VIII

H$_2$N—D'—COOH     VIII in which D' is a phenyl ring unsubstituted or substituted by one or more alkyl groups, a naphthyl group or a group of formula IX

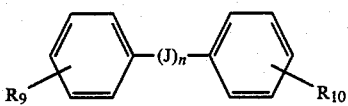

in which n is 0 or 1, J represents a methylene group, an oxygen or sulphur atom or a group of formula —SO$_2$— and R$_9$ and R$_{10}$ which are the same or different are H or alkyl groups, in which the alkenylphenol or ether thereof has the general formula X

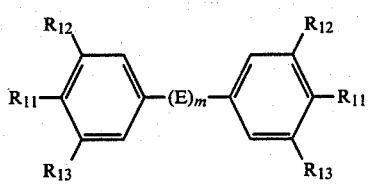

in which m is 0 or 1, E is a group of formula —C(-Me)$_2$—, —SO$_2$—, —SO—, —S— or —O—, R$_{11}$ is OH or OR$_{14}$ in which R$_{14}$ is an alkyl group, R$_{12}$ is an allyl or methallyl group and R$_{13}$ is H or an allyl or methallyl group.

3. Curable bisimide resin as claimed in claim 1 in which the bisimide of formula I is selected from the group consisting of 1,2-bismaleimidoethane, 1,6-bismaleimidohexane, 1,12-bismaleimidododecane, 1,6-bismaleimido-(2,2,4-tri-methyl)hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulphide, 3,3'-bismaleimidodiphenylsulphone, 4,4'-bismaleimidodiphenylsulphone, 4,4'-bismaleimidodicyclohexylmethane, 2,4-bismaleimidotoluene, 2,6-bismaleimidotoluene, 2,4-bismaleimidoanisole, N,N'-m-xylylenebismaleimide, N,N'-p-xylylenebismaleimide and mixtures thereof.

4. Curable bisimide resin as claimed in claim 1 in which the bisimide of formula I comprises (i) eutectic mixtures containing 4,4'-bismaleimidodiphenylmethane and 2,4-bismaleimidotoluene, (ii) eutectic mixtures containing 4,4'-bismaleimidodiphenylmethane, 2,4-bismaleimidotoluene and 1,6-bismaleimido(2,2,4-trimethyl)hexane and (iii) eutectic mixtures of 4,4'-bismaleimidodiphenylmethane and 2,4-bismaleimidoanisole.

5. Curable bisimide resin as claimed in claim 1 in which the amino acid hydrazide is m-aminobenzoic acid hydrazide.

6. Curable bisimide resin as claimed in claim 1 wherein the alkenylphenol is o,o'-diallybisphenol A.

7. Curable resin as claimed in claim 1 containing up to 80% of the total final resin mixture by weight of a reactive diluent selected from styrene, methylstyrene, vinyltoluene, divinylbenzene, 1-ethyl-4-vinylbenzene, vinylcyclohexane, divinylcyclohexane, vinylpyridine, vinylpyrrolidone or mixtures thereof.

8. Curable resin as claimed in claim 7 wherein the reactive diluent is styrene or divinylbenzene, the reactive diluent being present in quantities up to 30% of the total final resin mixture by weight.

9. Curable resin as claimed in claim 1 in which a catalyst is present in an amount of 0.01 to 10% by weight based on the total weight of the curable bisimide resin, said catalyst being (i) an ionic catalyst selected from the group consisting of (a) an alkali metal compound, (b) a monoamine, (c) a heterocyclic amine, (d) a polyamine containing several amino groups of different types, (e) a quaternary ammonium compound, and (f) mercaptobenzothiazole, (ii) a free radical polymerisation catalyst selected from the group consisting of (a) an organic peroxide and (b) an azo compound, or (iii) a metal acetylacetonate.

10. Curable resin as claimed in claim 9 in which (i) said ionic catalyst is (a) sodium methylate or an alkali metal hydroxide, (b) benzylamine, diethylamine, trimethylamine, triethylamine, tributylamine, triamylamine, N,N-dimethylaniline, N,N-dimethylbenzylamine, tetramethyldiaminodiphenylmethane, N,N-diisobutylaminoacetonitrile or N,N-dibutylaminoacetonitrile, (c) quinoline, N-methylpyrrolidine, imidazole, benzimidazole, N-methylmorpholine or azabicyclooctane, (d) a mixed secondary/tertiary polyamine, (e) benzyltrimethylammonium hydroxide and benzyltrimethylammonium methoxide or (f) mercaptobenzothiazole, (ii) said free radical polymerisation catalyst is (a) ditertiary butyl peroxide, diamylperoxide or t-butylperbenzoate or (b) azoisobutyronitrile, and (iii) said metal acetylacetonate is vanadium acetylacetonate.

11. Prepolymer obtained by heating the curable resin as claimed in claim 1 to temperatures of between 80° and 200° C. for a time sufficient to obtain a still formable product.

12. Solution containing 25% to 65% by weight of curable resin as claimed in claim 1 in dimethylformamide, dimethylacetamide, N-methyl pyrrolidone, tetramethyl urea, acetone, methylethyl ketone, methylisobutyl ketone, cyclohexanone, methylene chloride, ethyl chloride, 1,2-dichloroethane, dioxane, tetrahydrofuran, ethyl glycol, ethyl acetate, ethyl glycol acetate, methyl glycol acetate, diethyleneglycol diethyl ether, diethyleneglycol monoethyl ether acetate or a mixture thereof.

13. Crosslinked polymer derived by heating the curable resin of claim 1 to temperatures of between 80° and 400° C. for a time sufficient to complete cure.

14. Crosslinked polymer derived by heating the prepolymer of claim 9 to temperatures of between 80° and 400° C. for a time sufficient to complete cure.

* * * * *